Dec. 11, 1923.
W. BRINK
1,477,103
GASOLINE RECOVERY
Original Filed July 12, 1918
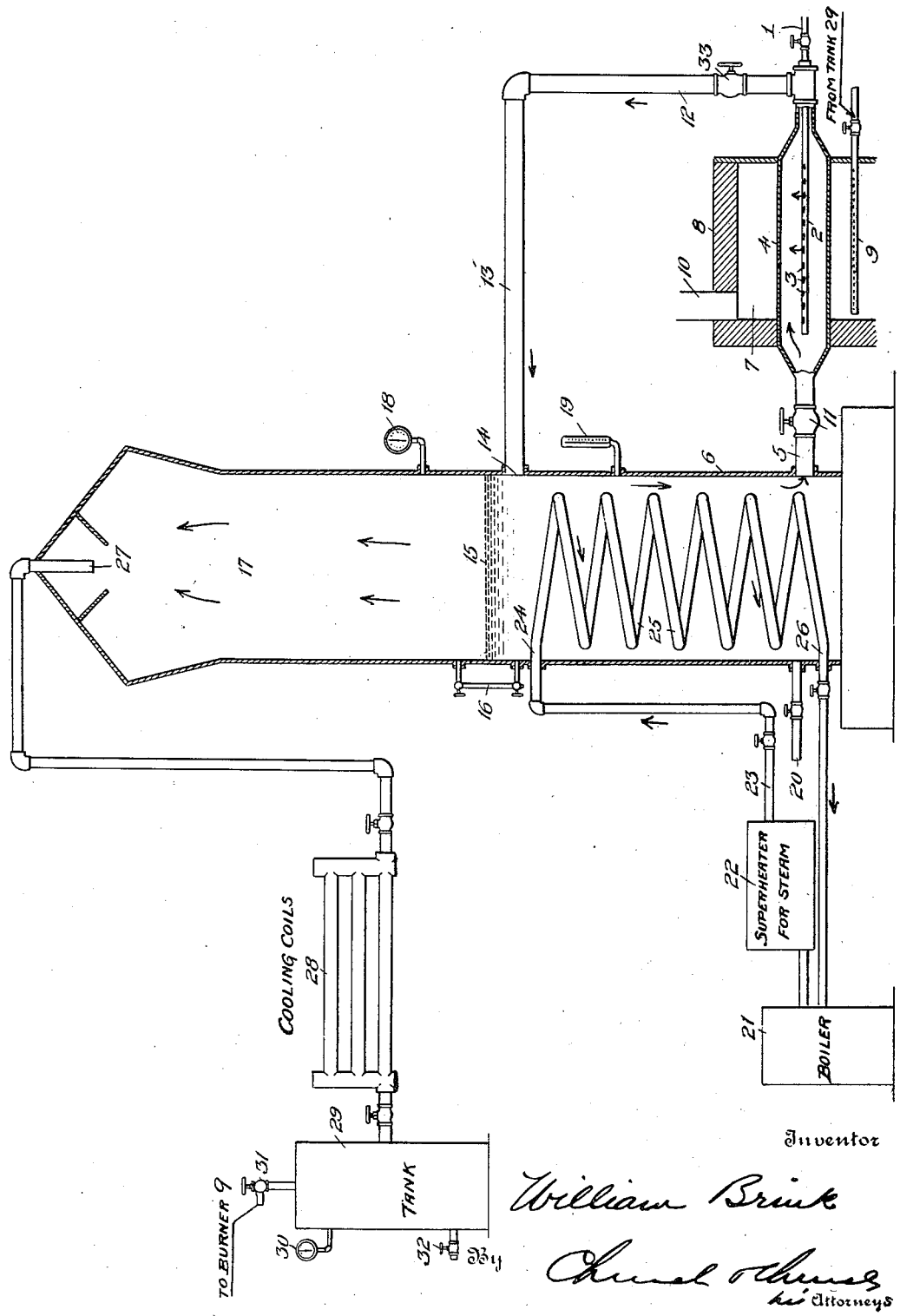
Inventor
William Brink
his Attorneys Patented Dec. 11, 1923.

1,477,103

UNITED STATES PATENT OFFICE.

WILLIAM BRINK, OF HENRYETTA, OKLAHOMA.

GASOLINE RECOVERY.

Application filed July 12, 1918, Serial No. 244,609. Renewed September 7, 1923.

*To all whom it may concern:*

Be it known that I, WILLIAM BRINK, a citizen of the United States, residing at Henryetta, in the county of Okmulgee and State of Oklahoma, have invented certain new and useful Improvements in Gasoline Recovery; and I do hereby declare the following to be a full, clear, and exact description of the same, reference being had to the accompanying drawings, forming part of this specification.

This invention relates to the recovery of gasoline from natural gas and has for its object the increasing of the amount of liquid fuel that can be obtained from a given quantity of natural gas over that which is possible by any heretofore known process of gasoline extraction. I secure this increased yield by moistening the dry field gas with crude oil, waste oil, or even bottom settlings heated to a temperature near the vaporization point, and then collecting and cooling the combined vapor and gas to form liquid gasoline.

In place of the dry field gas I may use residue gas or salt water gas, and since the greater percentage of each of these gases has heretofore been utterly wasted, it will be seen that in this and in the use of bottom settlings I have not only conserved great waste to the needs of the Nation, correspondingly increasing the supply of motor fuel, which is rapidly dropping to a point short of the present need, but I provide means of disposing of waste material that has hitherto presented difficulties of disposal, the laws of several States, among them Oklahoma, requiring oil pumpers to collect their bottom settlings in pools and there burn them to prevent the destruction of vegetation caused by them, as well as the death of fish in the stream, a small amount of bottom settlings escaping into a stream causing the loss of all fish therein.

Reference is now had to the accompanying drawings forming part of this specification, in which the figure is a diagrammatic view of the preferred form of the apparatus for performing the process of gasoline recovery embodying my invention.

In this figure, 1 represents a field line or a line from a gasoline plant of any usual type, pipe 1 in such case conveying residue gas. This pipe 1 ends in a spray section 2 of any desired form such as a split tube or a tube provided with a plurality of successively larger orifices 3, 3, as shown, the object being to spray the gas as evenly as possible to the oil in the cracking tube 4 formed by enlarging the pipe 5 leading from the reservoir 6 as it passes through the combustion chamber 7 of a furnace 8 heated by a gas burner 9 of one or more sections as may be desired. This furnace may be of sufficient size to accommodate a plurality of cracking tubes, being of the usual style of stone work and being provided with the customary flue 10 for the waste products.

The pipe 5 is provided with a one-way valve 11 between the still 6 and the cracking tube 4 which permits the oil in the reservoir to pass into the cracking tube when flow is started by the heating of the liquid in the tube 4, the flow taking place through the cracking tube in a direction opposite to that in which the gas is flowing, and vertically upward through pipe 12, and thence via horizontal pipe 13 to the reservoir at point 14 slightly below the normal oil level 15 of the reservoir, such level being maintained by help of the liquid gauge glass 16.

From point 14 the heavier portions of the moving fluid sink to the bottom of the reservoir to pass again through the same cycle until cracked to a point where they are sufficiently light to pass from the liquid into the dome 17 with the gas from the pipe 1, it being understood that the greater part of such gas has by this time become chemically or mechanically combined with the vapor of the heavier oil to form a gas mixture which upon cooling will yield what is known as gasoline.

Oil from a storage tank is pumped through pipe 20 into the reservoir to a pressure indicated by pressure gauge 18 and to a level indicated by gauge 16, the temperature being shown by thermometer 19 located between point 14 and the inlet to the cracking tube.

In starting the apparatus it is necessary to first heat the oil in the reservoir to a temperature somewhere near the boiling point of the liquid and for this purpose I provide a boiler 21 delivering steam to a superheater 22 (which may be omitted when using the lighter oils) and from there on to a pipe 23 leading to the upper end 24 of a coil 25 within the reservoir 6. From the lower end 26 of such coil the steam is returned to the boiler. The apparatus mentioned in this paragraph, it will be noted is required only for starting the apparatus as the heat from burner 9 is sufficient to maintain the liquid at proper temperature when the device is once in operation.

At the top of the dome 17 the vapors are led past a plurality of baffle plates to a pipe 27 leading to the cooling coils 28 in which the combined gas and vapor condense to a liquid gasoline and pass to the accumulator tank 29 provided with the usual pressure gauge 30, relief valve 31, and discharge faucet 32.

In practice the cracking tubes 4 are found to carbonize quite rapidly and must be replaced at frequent intervals, this being a simple operation, all that is necessary being to lock the one-way valve 11 shut and to close the gate valve 33 and then replace the tube 4 with a clean tube. By having these tubes in batteries, no time is lost in substituting these parts.

Pipe 1, as has been stated, may convey residue gas or gas from the field, such, for example, as salt water gas which normally yields about a quart per thousand, and this gas with the present apparatus may be made to yield as much as ten gallons of light liquid hydrocarbon with an expenditure of not over three gallons of the heavy oil. In securing this amount of gasoline, the entire heat energy of the salt water gas is not taken and it is found that with a pressure in the dome of not over 50 pounds per square inch the final residue gas from the second stage will still be suitable for use in the burner 9. A pipe may lead directly from the valve 31 to the burner 9 or a preferable way would be to store the final residue gas and supply it under pressure to the burners.

What is claimed is:

1. The process of obtaining gasoline from natural gas which consists in providing a continuous flow of liquid hydrocarbon oil from and back to a considerably larger quantity, subjecting a relatively small portion of the oil while in motion to a cracking temperature, and in spraying natural gas to such portion of the oil.

2. The process of obtaining a gasoline from a heavy waste hydrocarbon and natural gas which consists in heating a small portion of the heavy oil to cause the oil to circulate in a closed path, delivering natural gas under pressure to said constantly circulating oil and in a direction of flow opposite to that of said heavy oil, returning the small portion of heavy oil to the remainder of the oil, freeing said gas together with vapor from the heated oil, condensing said vapors and returning the vaporized heavy oil to the cycle.

WILLIAM BRINK.